United States Patent [19]

Evangelista

[11] E Re. 31,019

[45] Reissued Aug. 31, 1982

[54] STRINGLESS ELECTRONIC MUSICAL INSTRUMENT

[76] Inventor: Fred J. Evangelista, 14 Linda La., Severna Park, Md. 21146

[21] Appl. No.: 162,777

[22] Filed: Jun. 25, 1980

Related U.S. Patent Documents

Reissue of:

[64] Patent No.: 4,177,705
Issued: Dec. 11, 1979
Appl. No.: 973,801
Filed: Dec. 28, 1978

[51] Int. Cl.[3] ..... G10H 1/00; G10H 1/02

[52] U.S. Cl. ..... 84/1.16; 84/1.01; 84/DIG. 7; 84/DIG. 8; 84/DIG. 30

[58] Field of Search ..... 84/1.01, 1.16, DIG. 7, 84/DIG. 8, DIG. 30; 330/284, 302

[56] References Cited

U.S. PATENT DOCUMENTS

| | | | |
|---|---|---|---|
| 2,222,057 | 11/1940 | Benioff | 84/1.16 |
| 2,842,021 | 7/1958 | Oncley | 84/1.01 |
| 3,124,760 | 3/1964 | Dijkstra | 330/284 |
| 3,223,771 | 12/1965 | Hopping | 84/DIG. 30 |
| 3,306,968 | 2/1967 | Markowitz | 84/1.04 |
| 3,340,343 | 9/1967 | Woll | 84/1.16 |
| 3,524,375 | 8/1970 | Hopping | 84/1.16 |
| 3,530,226 | 9/1970 | Wheeler | 84/DIG. 30 |
| 3,555,166 | 1/1971 | Gasser | 84/1.01 |
| 3,662,641 | 5/1972 | Allen et al. | 84/1.01 |
| 3,666,875 | 5/1972 | Ranzato | 84/1.16 |
| 3,845,683 | 11/1974 | Lehmann | 84/1.01 |
| 3,883,815 | 5/1975 | Grundy | 330/302 |
| 4,078,464 | 3/1978 | Sugiyama | 84/1.01 |
| 4,079,651 | 3/1978 | Matsui | 84/DIG. 7 |

FOREIGN PATENT DOCUMENTS

| | | |
|---|---|---|
| 1262745 | 3/1968 | Fed. Rep. of Germany . |
| 1282428 | 11/1968 | Fed. Rep. of Germany . |

OTHER PUBLICATIONS

Millman and Taub, "Pulse Digital Switching Waveforms," McGraw-Hill, 1965, pp. 50–54.

Ward, Electronic Music Circuit Guidebook, 1975, pp. 43 and 156.

*Primary Examiner*—J. V. Truhe
*Assistant Examiner*—Forester W. Isen
*Attorney, Agent, or Firm*—Schwartz, Jeffery, Schwaab, Mack, Blumenthal & Koch

[57] ABSTRACT

Disclosed is an electronic musical instrument resembling a guitar that is played like a guitar and sounds like a guitar; however, it is stringless and has a plurality of flexible actuator blade type members which are mounted on edge and are adapted to be strummed or picked. Flexing of each actuator blade in either direction closes one or more leaf type switches which controls the amplified output of an electronic oscillator whose fundamental operating frequency is further varied in accordance with finger actuation of a plurality of fret-board switches. Although the invention in its preferred embodiment is directed to a guitar-like instrument, it is also applicable to other types and classes of musical string instruments such as a violin.

20 Claims, 11 Drawing Figures

FIG. 1
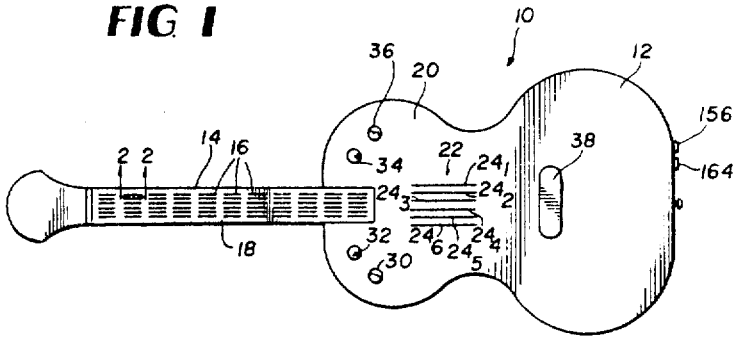
FIG. 4
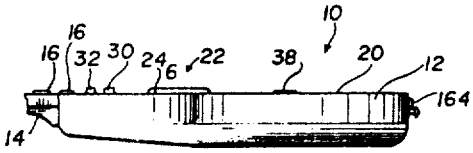
FIG. 2
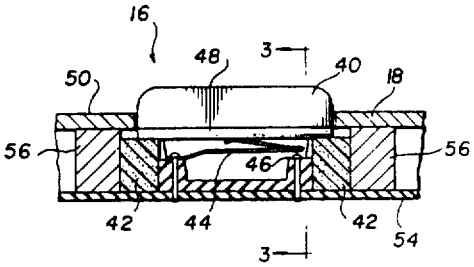
FIG. 5
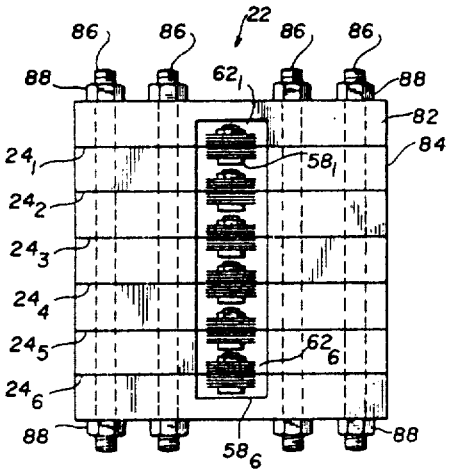
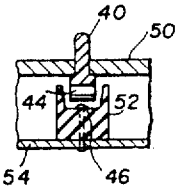
FIG. 3

FIG. 6
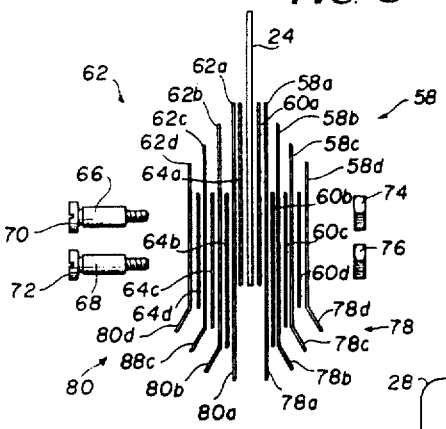
FIG. 7A
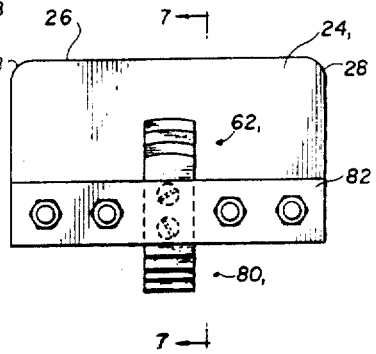
FIG. 7B
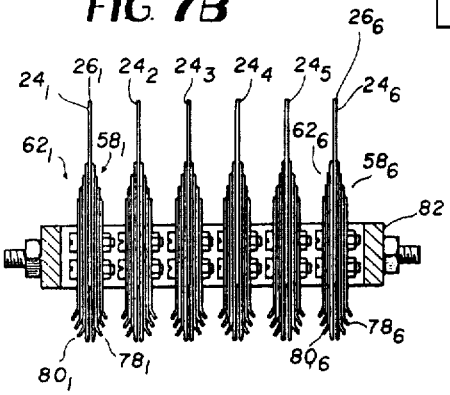
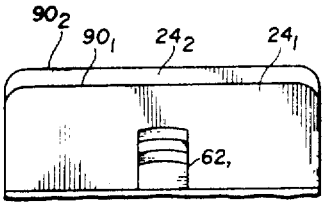
FIG. 8A
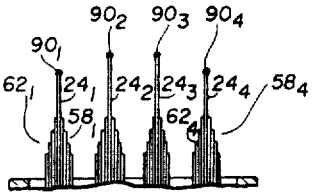
FIG. 8B

STRINGLESS ELECTRONIC MUSICAL INSTRUMENT

Matter enclosed in heavy brackets [ ] appears in the original patent but forms no part of this reissue specification; matter printed in italics indicates the additions made by reissue.

Background of the Invention

This invention relates to improvements in musical instruments and more particularly to an electronic musical instrument for simulating a stringed instrument.

On a conventional guitar, whether it is an acoustical type or an electrically amplified type, the sounds originate from vibrating strings which are set in motion by a picking or strumming action. A note is selected by playing an open string or by fingering a string on a particular fret position on the neck of the instrument. This action serves to change the vibrating length of the string thereby producing the vibrating frequency of the desired tone. Chords are played by picking, plucking or strumming more than one string, either sequentially or with one stroke of the hand. Accordingly, a conventional guitar is played by fingering the strings on the neck of the instrument with one hand, while picking or strumming the strings with the other hand.

While stringless guitar-like musical instruments have been disclosed, for example in U.S. Pat. Nos. 3,340,343, 3,555,166, and 3,666,875, these instruments in addition to having a plurality of finger actuated switches located in a fret-board type of arrangement on the neck of the instrument, also includes means located on the body of the instrument, requiring it to be played much like a keyboard instrument, e.g. an accordian wherein manual depressions of an element is required.

The present invention on the other hand is directed to a stringless instrument, which can be played using similar techniques to those described above for a conventional guitar. Furthermore, a player who has learned to play a conventional guitar can play an instrument according to the subject invention immediately without having to relearn new fingering positions for either the neck of the instrument or for the body of the instrument, meaning that melodies and chords and combinations thereof can be picked or strummed with a conventional plectrum as well as plucked or strummed with the hand in the conventional manner.

Summary

Briefly, the subject invention is directed to an electrically controlled musical instrument embodying self-contained electronic tone generation modulation and amplification circuitry for the production of musical sounds by means of a plurality of relatively thin flexible blade type switch actuator members which are mounted on edge and are located on the front surface of the body of the instrument in line with a fret-board switch assembly. The outward edge of each actuator resembles the cross section of a string and is adapted to be plucked, strummed, struck or bowed. Each flexible blade type actuator is adapted to be flexed in either direction, causing closure of one or more leaf type electrical switches which are adapted to control the amplified output of an electronic oscillator circuit whose fundamental operating frequency is adapted to be further varied in accordance with the operation of finger actuated fret switches located on the neck of the instrument.

The preferred embodiment of this invention will be disclosed primarily in terms of a guitar-like musical instrument which comprises one of the "lute" classes of strummable string instruments. It will also become apparent that other instruments in the lute class can be simulated in the same manner. Furthermore, the inventive concept can be used for electronic simulation of "viol" class of musical stringed instruments such as the violin, cello and other instruments which are played with a bow as well as those plucked with the hand.

It can be seen, therefore, that the primary object of the present invention is to provide a stringless musical instrument which can be played as though it were, in fact, a stringed musical instrument.

Other objects and advantages will become immediately apparent as the following specification is considered in conjunction with the accompanying drawings.

Brief Description of the Drawings

FIG. 1 is a top plan view of a guitar-like musical instrument broadly illustrating the preferred embodiment of the subject invention;

FIG. 2 is a fragmentary cross sectional view taken along the lines 2—2 of the neck portion of the instrument shown in FIG. 1 and being illustrative of one fret-key switch assembly;

FIG. 3 is an end sectional view of the fret-key switch assembly shown in FIG. 2 taken along the lines 3—3;

FIG. 4 is a partial side elevational view of the body portion of the instrument shown in FIG. 1;

FIG. 5 is a top plan view of an assembly of plural flexible blade type actuator members mounted on the body of the instrument for simulating individual strings;

FIG. 6 is an exploded end view of one of the flexible blade actuator members shown in FIG. 5 together with respective switch contact assemblies on either side thereof;

FIGS. 7A and 7B are illustrative side and end planar views of the type of flexible blade assembly utilized for lute type instruments;

FIGS. 8A and 8B are side and end planar views of the type of flexible blade assembly utilized for viol type instruments.

Description of the Preferred Embodiment

Figure 9:
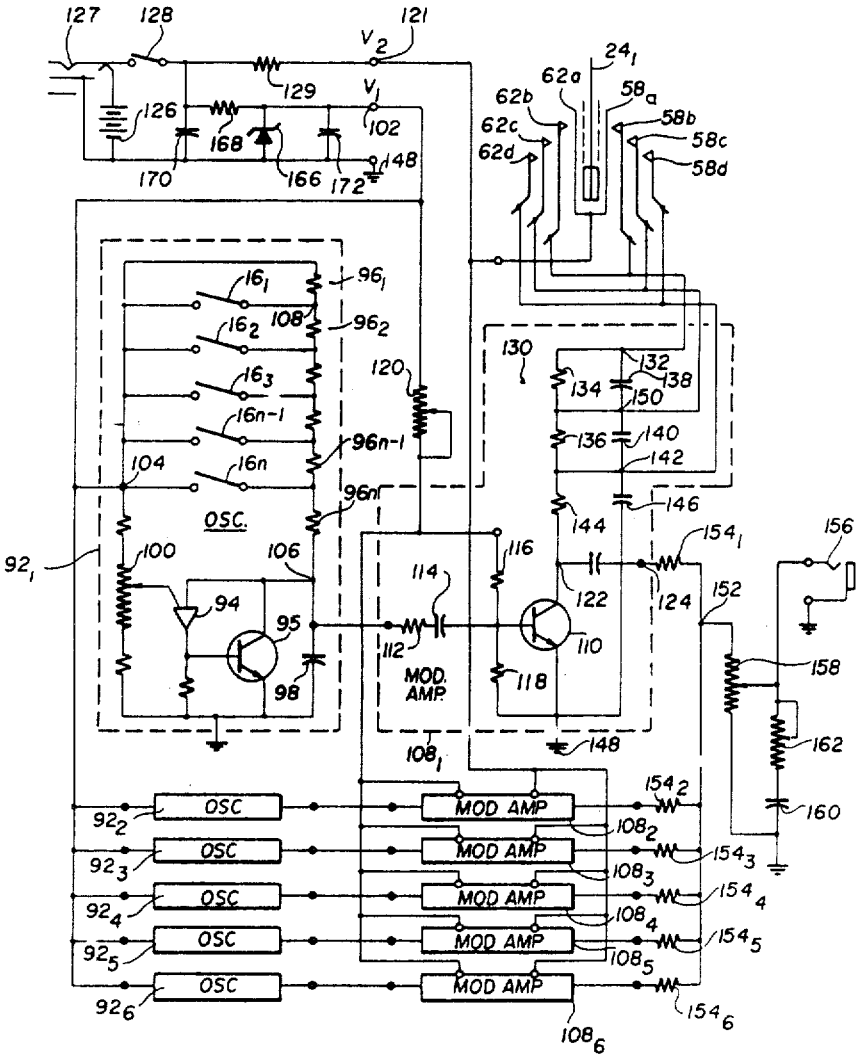
FIG. 9 is an electrical schematic diagram illustrative of the circuit details for one of six flexible actuator blade members and its interconnection with the remaining five simulated strings to form a complete electronic system for generating musical sounds.

Referring now to the drawings and more particularly to FIG. 1, there is disclosed a top plan view of a guitar-type instrument 10 consisting of a body portion 12 and a neck portion 14. Along the neck portion 14 of the instrument 10 is fret switch assembly including a plurality of keys 16 arranged in sets along the face of the finger board 18. Such apparatus is well known to those skilled in the art, a typical example being shown for example in the above referenced U.S. Pat. Nos. 3,555,166 and 3,666,875.

On the upper face 20 of the body portion 12 is located an assembly 22 of six identical string simulation means which will be discussed in detail to permit a player experienced with a conventional stringed instrument to immediately play the subject instrument with similar hand and finger motions applied to the assembly 22 in addition to those established for the fret-switch keys 16 on the finger board 18. Reference numeral 24 as shown in FIG. 6 generally designates one of six identical flexible blade type switch actuator members $24_1$, $24_2$ . . . $24_6$. This arrangement is shown in detail in FIG. 5. The actuator members are generally rectangular in shape as depicted in FIGS. 7A and 8A and are relatively thin so as to permit flexure transversely to their longitudinal dimension. As shown in FIG. 7A, the upper edge $26_1$ of member $24_1$ runs lengthwise for a predetermined distance terminating in rounded corners 28. The members $24_1$ . . . $24_6$ are of uniform thickness and when viewed from above as shown in FIG. 5, are analogous to the cross section of a muscial string located thereat in a conventional guitar-like instrument.

Thus the flexible blade type elements $24_1$–$24_6$ can be picked with a conventional type plectrum, plucked with fingers, or strummed by both means with one stroke of the hand in either direction in a normal manner. Accordingly, conventional finger, hand and arm motions familiar to the musician experienced with conventional stringed instruments are used. It should be noted that the assembly 22 is preferably located at the conventional waist region of the instrument body 12 on the longitudinal axis of the instrument and that each flexible blade element $24_1$ . . . $24_6$ is parallely aligned with the neck portion 14 in the same manner as the string it is intended to simulate. While mention of the fact that the actuators $24_1$ . . . $24_6$ are generally rectangular in shape, 1 is to be made that they are of sufficient length along the longitudinal axis of the instrument to avoid the need to search for their location when picking or strumming since searching tends to detract from the normal motions already cultivated by an experienced player of a conventional instrument, particularly so in view of the fact that the body portion 12 is observed to a much lesser extent than the neck portion 14.

A plurality of knobs 30, 32 and 34 are conveniently arranged on the face 20 of the body portion 12 for effecting tone control, harmonic control and a combination of the volume control as well as an on/off switch, respectively. Reference numeral 36 is intended to designate a suitable indicator light to indicate the power status of the instrument. Also, shown in FIG. 1 on the surface 20 of the body portion 12 is reference numeral 38 which is intended to designate a muting switch pad associated with electronic circuitry, not shown, which is used to provide abrupt sound cut off similar to that accomplished when usable string vibrations are stopped with the hand. For lute type instruments, it is preferred that the muting switch pad 38 be located to serve as a rest for the heel of the picking hand so that it can be depressed for muting instantly without having to hunt for the pad.

Referring now to FIG. 2, there is disclosed the details of one typical fret-switch key 16 shown in FIG. 1. A switch actuator member 40 is held in its unactuated position against the underside of the fingerboard 18 by means of resilient foam material components 42 which are located at either ends of the element 40. The durometer softness of the material from which the foam material is comprised is selected to provide a comfortable feel to the player, with considerations including low finger pressure but not so low that undesired actuation can take place. A further consideration is to provide a pre-travel of the member 40 downward before a pair of electrical switch contacts 44 and 46 are closed. The spring leaf configuration of member 44 permits over-travel after the switch contacts close. The pre-travel aids to prevent unwanted sounds from emanating when the element 40 is inadvertently depressed by the fingers while using them for guidance or while straddling them in a manner which is normal for playing stringed instruments. The over-travel is provided for improved electrical contact and to minimize finger fatigue, which may occur sooner when stopped by an unyielding switch key.

Further to this end, it is preferred that the key element 40 be permitted to be depressed so that the upper surface 48 is nearly flush with the fingerboard surface 50, permtting only enough protrusion to feel it for guidance when it is fully depressed. Accordingly, when one of the key elements 40 is depressed, it is guided to the proper location over the contact member 44 by means of angulated guides which form an integral part of the contact mounts 52 as shown in FIG. 3. These guides permit a freedom of fit for the key element 40 in its finger-board slot so as to provide a bind-free action.

An insulating board member 54 is used for mounting the contact mount 52 with spacer bars 56 between each fret position. A multiple pin connector, not shown, is utilized at the end of the mounting board member 54 where it meets the body portion 12 to interface the fret-key switch elements 16 with electronic circuitry shown in schematic form in FIG. 9 contained inside of the body portion 12 of the instrument.

The major improvement of the subject invention consists in the actuator assembly 22 briefly referred to above and its related electronic circuitry. Associated with each actuator element $24_1$, $24_2$ . . . $24_6$ is an assembly of six leaf type switches arranged so that three switches are located on each side of an actuator. Referring now to FIG. 6 which is intended to typically illustrate one element 24 of the six identical structures $24_1$ . . . $24_6$, flexible leaf type electrical contact strips $58_a$, $58_b$, $58_c$ and $58_d$ are located on one side of the actuator 24 to form one set of switch contacts 58. Mutual separation of the contact strips is provided by means of electrical insulator members $60_a$, $60_b$, $60_c$ and $60_d$. In a like manner, on the opposite side of the element 24 are electrical leaf type contact strips $62_a$, $62_b$, $62_c$ and $62_d$ and being separated from each other by means of the insulator elements $64_a$, $64_b$, $64_c$ and $64_d$. These form the other set of switch contacts 62. The insulator elements $60_a$ . . . $60_d$ and $64_a$ . . . $64_d$ are preferably comprised of, for example, thin plastic strips.

Additional insulation is provided by insulating sleeves 66 and 68 on a pair of contact mounting screws 70 and 72 with which nuts 74 and 76 respectively engage to hold the whole assembly together as shown, for example, in FIG. 7B. The lower terminal portions of the switch contacts $58_a$ . . . $58_d$ and $62_a$ . . . $62_d$ comprise tab portions $78_a$, $78_b$, $78_c$ and $78_d$ and $80_a$, $80_b$, $80_c$ and $80_d$ for making electrical connections to the electrical circuit elements shown in schematic form in FIG. 9.

The flexible actuator type switch assembly shown in FIG. 6 can be mounted singly or in multiples, depending on the type of instrument desired. The arrangement shown in FIGS. 7A and 7B discloses a six member configuration for simulating a lute-type instrument while the configuration shown in FIGS. 8A and 8B comprise a four member configuration simulating a viol-type instrument. In either case the switch assemblies are ganged and spaced apart from one another utilizing an end frame 82, a plurality of spacers 84 and mounting screws and nuts 86 and 88.

Accordingly then, each of the actuators $24_1 \ldots 24_6$ are comprised on thin flexible spring-like material which are mounted on edge and project above the electrical contact strips and are free to bend or deflect when a force normal to the upper playing surface is applied. Since the contacts are mounted to the lower portion of the actuators which is firmly held, it is possible to bend the upper portion of the actuator by applying a small force until, for example, electrical pole piece $58_a$ as shown in FIG. 6 contacts element $58_b$, affecting a closing of one pair of switch contacts. Initial movement in the other direction causes elements $62_a$ and $62_b$ to make contact. Additional incremental forces will cause additional sequential contact closures to take place, namely element $58_c$ would contact element $58_b$ and $58_d$ would make contact with element $58_c$ and so forth. When the force is removed, the actuator 24 and any contacts closed will return to their original upright normally open condition as shown in FIG. 6. These events will take place when the deflecting force is applied in either direction normal to the plane face and nearer the top edge of the actuator 24. By this means the same magnitude of force applied in either direction will close the same number of switch contacts and removal of the force will allow the contacts to spring back to their open state.

From the foregoing description it can be seen that if a guitar player for example uses a conventional type plectrum to deflect the actuator 24 shown in FIG. 6, first in one direction and then the other, the picking action of a conventional guitar is simulated. The actuators $24_1 \ldots 24_6$ as shown in FIG. 7B, for example, may be deflected with a thumb or fingers or a combination of both to provide a plucking action or when desirable, a complete set of actuators $24_1 \ldots 24_6$ can be strummed with one sweeping motion of the hand in either direction which is normal. It should be emphasized here that all of the action described can be performed by a musician already familiar with the guitar without having to relearn new techniques or fingering positions.

With respect to the configuration for implementing the type of string instruments in the "viol" class which includes those instruments characteristically played with a fiddler's bow such as a violin, cell, etc. reference to FIGS. 8A and 8B indicates that the upper edges of four flexible actuators $24_1 \ldots 24_4$ are arranged in an arched profile similar to the bridge of a violin making it possible to be played with a fiddler's type of bow, not shown, to contact, when desired, only one simulated string at a time. Such a configuration is possible because the electronic circuitry shown in FIG. 9, to be discussed subsequently, in addition to being utilized in connection with a guitar-type instrument, is also designed such that: (1) the "attack" portion of an audio frequency envelope is produced upon the initial deflection of an actuator $24_1 \ldots 24_4$ rather than upon release as is customary; (2) the sound is sustained for as long as the deflection of the actuator is maintained by the dynamic friction of the moving bow; and (3) the sound dampens gradually when the actuator is allowed to return to its normal state upon lifting of the fiddler's bow. Assuming that the actuator elements $24_1 \ldots 24_4$ are made of thin flexible metallic material such that the coefficient of friction at the thin top edge 26 is inadequate for proper bowing, the edge may be capped with a plastic or similar edging or beading elements $90_1 \ldots 90_4$ to provide a proper friction factor. Alternatively, the actuator elements $24_1 \ldots 24_4$ etc. may be made from a plastic or similar material which has been selected for optimum flexibility and optimum friction factor. Accordingly, the subject invention is not intended to be limited to the simulation of stringed instruments of the lute class only, but rather it is intended to include the simulation of other instruments in which the strings are played by picking, plucking, strumming, bowing and also by known percussive methods.

A major feature of the assembly 22 in its various embodiments as shown in FIGS. 5 through 8B is the capability of producing "expressive" variations in sound volume as a function of the amount of actuator deflection of any element $24_1 \ldots 24_{n-1}$, $24_n$. It can be seen, for example, with reference to FIG. 6 that two sets 58 and 62 of three switches each are adapted to provide three levels of expressive sound volume. The closest strip $58_a$ and $62_a$ on either side of the contact 24 is used as a pole piece to provide a fixed supply potential $V_2$ (FIG. 9) to the remaining three contact strips $58_b$, $58_c$ and $58_d$ and $62_b$, $62_c$ and $62_d$, respectively. When the actuator 24 deflects either strip $58_a$ or $62_a$ to its nearest contact $58_b$ or $62_b$ the lowest level of sound will be produced. As the deflection is increased, the second contact $58_c$ or $62_c$ is closed and a third $58_d$ or $62_d$ in turn. As each contact closes against its neighbor, the expressive sound volume increases to a higher level as will be shown. Although three levels of expressive sound volume are illustrated, it should be noted that if additional contacts are included in the stack, then additional sound levels can be provided. This provision of variations in sound volume enables the musician to perform with "expression" using dynamic techniques similar to those applied to a conventional string instrument, i.e. a greater string deflection produces a greater volume of sound. Another important feature of the subject invention is the capability of sustaining the sound when desired by the musician during a musical score or as a part of it without resorting to manipulation of other controls. This is accomplished by holding or or more of the simulated strings, i.e. actuators $24_1 \ldots 24_n$ in the deflected position in either direction. When they are released, the sound will dampen out gradually. Also, "sustain" effects can be applied with increasing or decreasing sound volume while the finger board keys 16 shown in FIG. 1 are run through a musical sequence or while a particular note or chord is held. The resulting advantage of this sustaining feature is twofold, namely it provides an additional form of "expression" for the musician when desired without detracting from the normal method of playing the instrument, and the musician can change the sound of the same instrument instantly to sound like a plucked string instrument, an organ, or even a violin type instrument.

In addition to the normal type of tone control provided by the knob 30 as shown in FIG. 1, a harmonic control is also provided by means of the knob 32. With the control knob 32, the sounds are made to vary in a manner which may be described as "timbre", "color", "presence", etc. which when used in conjunction with the tone control knob 30, can produce a wide range of tonal "voice" variations. The uniqueness of this harmonic control function lies in the simplicity of the circuit and its implementation which will now be described.

Referring now to the schematic diagram shown in FIG. 9, the basic audio frequency signals to be generated in accordance with the aforementioned assembly 22 can be provided by any waveform generating circuitry which can provide time varying waveforms, e.g. triangular or sawtooth type waveforms, at the fundamental frequencies required for each open string tone and the required incremental frequencies for each fret tone. In its preferred embodiment, the basic frequencies are generated in the subject invention by six relaxation oscillator circuits $92_1$, $92_2$, $92_3$, $92_4$, $92_5$ and $92_6$, which are identical insofar as circuit configuration is concerned but the relative frequency determining values of the components differ. Accordingly, only one of the oscillator circuits $92_1$ is shown in detail and is configured basically about a programmable unijunction transistor 94, n-p-n junction transistor 95 and a plurality of fret-key switches $16_1$, $16_2$ . . . $16_{n-1}$ and $16_n$ which are used to select desired increments of resistances $96_1$, $96_2$ . . . $96_{n-1}$ and $96_n$ to form a specific RC time constant with the fixed capacitor 98 to control the oscillator frequency. Smaller frequency changes are made by a variable resistance element 100 which is utilized for simulated string "tuning" purposes. The design parameters for this type of oscillator circuit are well defined in any typical programmable unijunction transistor manufacturer's brochure, e.g. G.E. application notes AN60-20 dated 1/71 at page 4 and AN90-93 dated 1/72 at page 12. The programmability feature of this type of circuit is well known to have been used as a means of organ tone generation. The fundamental or "open string" frequency of the oscillator circuit $92_1$ is obtained when a fixed supply potential $V_1$ appearing at terminal 102 and coupled to circuit junction 104 is applied to circuit junction 106 common to capacitor 98 through the total series combination of resistances $96_1$ . . . $96_n$ which occurs when all of the fret-switches $16_1$ . . . $16_n$ are in their open condition. When the upper fret-switch $16_1$ is closed, the voltage $V_1$ appearing at junction 104 is applied at junction 108, excluding the upper resistor $96_1$ from the RC time constant to thereby produce the next higher tone frequency. Therefore, eliminating each additional resistor $96_2$, $96_3$, etc. in succession results in incrementally higher toner changes for successively higher fret positions. With this configuration, depressing one or more fret key 16 of the same set will produce the tone only of the highest fret key $16_n$ depressed. In summary, the function of the fingerboard key switches is to apply the voltage $V_1$ to the resistor termination which will produce the desired tone.

The output of the programmable unijunction oscillator $92_1$ which appears at junction 106 is coupled to a respective class C type modulating output amplifier circuit $108_1$ which includes transistor 110. The purpose of the modulation amplifier $108_1$ is to receive a variable frequency audio tone signal having a constant amplitude or envelope from the audio frequency oscillator voice" 1, reshape it to a form which contains enriched harmonics, amplify the new tone signal, and then modulate the signal envelope to simulate the desired sound or "voice of the musical instrument being simulated. The output of the oscillator $92_1$ is fed to the base of the transistor 110 by means of resistor 112 and coupling capacitor 114. Reshaping is provided by the base bias for class C operation provided by a network consisting of resistors 116 and 118 and the variable resistance 120 coupled back to the supply potential $V_1$. The variable resistance 120 is adapted to be mechanically coupled to the control knob 32 shown in FIG. 1. When the variable resistor 120 is adjusted for zero resistance and the actuator $24_1$, for example is deflected, an audio tone signal comprised of narrow low duty cycle rectangular pulses is produced at the collector junction 122 of transistor 110 which is very rich in both odd and even harmonics. If the resistance 120 is varied to provide an increasing resistance, the pulse-width of the tone signal will increase up to a maximum duty cycle of 50% or less, thereby approaching a square wave, which is less rich in harmonics than a narrow rectangular pulse, containing only the odd harmonics. By this means the harmonic content of the output waveform or the "timbre" of the voice signal appearing at junction 122 is made variable. The net effect of this harmonic control achieved by means of varying the resistance 120 is to provide a wide range of instrumental voices and pleasing sound effects when desired by the musician without resorting to extraneous electronic circuits.

It should be pointed out, however, that no audio output will be produced until such time that the actuator $24_1$ closes one or more of the switch contact elements $58_a$ . . . $58_d$ or $62_a$ . . . $62_d$ to couple a supply potential $V_2$ from terminal 121 to the collector circuit of transistor 110. This supply potential is provided from the fixed DC source 126 via the switch 128 and resistor 129 or when desired from an external source, not shown, coupled to the connector 127. Deflecting the actuator $24_1$ in either direction produces a pulsed or sustained output waveform envelope of the audio frequency as desired by the musician depending upon whether the actuator is momentarily deflected or held in a deflected position. Instrument "voice" modulation, however, is provided by the network 130 which is a compensated balanced bridge attenuator network and the manner in which the actuator $24_1$ is moved. If the musician simply picked the actuator $24_1$ so that it is allowed to spring back like a string, a sound like a plucked string will be produced; however, if he deflects and holds the actuator $24_1$ in a deflected position, he can sustain the tone to produce tones like an organ or other tone substaining instruments, including "viol" types. The amplitude of the modulating waveform and therefore the sound volume is varied by the amount of deflection of the actuator $24_1$. As shown, three amplitude levels are available to the musician for sound volume expression purposes and they are proportional to the amount of deflection analogous to deflecting a musical string.

When the actuator $24_1$ is deflected to close the first contact pair $58_a$ and $58_b$, for example, or $62_a$ and $62_b$, a step input voltage $V_2$ is applied to circuit junction 132 of the compensated attenuator network 130 comprised of resistors 134 and 136 and capacitors 138 and 140. This type of circuit is disclosed, for example, in the publication entitled "Pulse, Digital and Switching Waveforms", Millman and Taub, published by McGraw Hill, 1965, at pp. 50–54. By this means a fast rising voltage pulse derived from the supply voltage $V_2$ occurs at circuit junction 142 which is coupled to the collector of transistor 110 via collector load resistor 144 and forms an abrupt leading edge "attack" portion of the modulating waveform and to charge the decay time storage capacitor 146. In the process, the attenuator capacitors 138 and 140 are also charged from the supply potential $V_2$. Upon release of the actuator $24_1$, the voltage source $V_2$ is cut off. Therefore, the only voltage remaining is supplied by one or more charged capacitors 138, 140 and 146. These capacitors discharge to ground 148 through the collector to emitter circuit of transistor 110 via the collector load resistor 144.

In doing so, a decaying envelope of the oscillator $92_1$ frequency appears at the collector junction 122 which closely simulates the gradually dampened waveform produced by the sound of a plucked string instrument. If on the other hand the actuator $24_1$ is held to keep one or more of its associated switch contacts closed, the voltage $V_2$ will be maintained and an output tone will be sustained for so long as it is held in the deflected position. Also after any sustained effect is terminated, the gradually dampened edge of the waveform will be produced by one or more of the discharging capacitors 138, 140 and 146. It should be noted also that a muting switch, not shown, can be used to curtail the decaying trailing edge when desired by the musician. Such a device, for example, would be a shorting switch for instantly discharging all three capacitors 138, 140 and 146 to ground. The switch actuator for such a device would be the muting pad actuator 38 shown in FIG. 1.

The modulating pulse generating used to simulate the sound of a plucked string for a stringless guitar-like instrument had in the past been a fixed wave shape and any changes in the wave shape when provisions were included had to be preset. As illustrated in the foregoing description, the pulse waveform generated by the subject invention can be varied in pulsewidth and/or amplitude purely as a function of the picking, plucking or strumming action of the actuators $24_1$, $24_2$, etc. by a musician. This versatility is made possible by providing for a fast rising leading edge (attack) for the amplitude modulating pulse of the voltage $V_2$ immediately upon the initial deflection of the actuator rather than after it is released as is customary.

As noted above, the fast rising leading edge required to simulate the percussive sound of a plucked string instrument is produced by the network 130 consisting of the bridge formed by resistors 134, 136 and capacitors 138 and 140 connected to the resistor 144 and capacitor 146. When the actuator $24_1$ is deflected slightly to close its first pair of switch contacts $58_a$ and $58_b$, for example, an impulse current is produced at junction 142 when a step voltage input $V_2$ is applied to the circuit junction 132. Under these conditions, capacitors 138 and 140 behave like short circuits such that the rise time of the step voltage appearing at circuit junction 132 is very nearly reproduced at circuit junction 142 while the final value voltage is attenuated by two stages of a simple passive resistive network made up of resistors 134 and 136. When the actuator $24_1$ is deflected further until the next contact $58_c$, for example is closed, the voltage $V_2$ is applied at circuit junction 150. At this point only one stage of resistive attenuation provided by resistor 136 remains ahead of circuit junction 142. Therefore, the amplitude of the signal at junction 142 is greater than when the voltage $V_2$ is applied to circuit junction 132, the result being an increase in sound volume. It can be seen then that when the actuator $24_1$ is deflected so that the third contact $58_d$ is closed, the voltage source $V_2$ is applied directly to circuit junction 142 with no attenuation. For this case, the amplitude of the output signal and therefore the volume of the sound produced at the collector junction 122 will be at its maximum value.

Accordingly, the compensated balanced bridge attenuator network 130 is adapted to provide leading edge conditioning (attack) for the modulation envelope as well as the trailing edge conditioning (decay) thereof in response to the selective actuation of the switch contacts associated with the actuator $24_1$. Control of the envelope amplitude for expressive sound volume as well as envelope width extension for control of sustained effects is thus provided. It should be pointed out that variations of the circuit configurations can readily be made to provide additional control of the functions described such as modulation envelope attack and decay time variations or additional special effects such as vibrato, etc. without departing from the spirit and scope of the invention. The output of the modulation amplifier $108_1$ as well as the other five amplifiers $108_2$ . . . $108_6$ are coupled in parallel to a common summing junction point 152 by means of the summing resistors $154_1$ . . . $154_6$. The common circuit junction 152 is coupled to an output jack 156 by means of a volume control potentiometer 158 which is adapted to be mechanically coupled to the control knob 34 shown in FIG. 1 and a variable RC tone control circuit including capacitor 160 and a variable resistor 162 which is adapted to be connected to the control knob 30 also shown in FIG. 1.

When desirable, the on/off switch 128 can be made an integral part of the volume control potentiometer 158 coupled to the knob 34 shown in FIG. 1. Additionally, a zener diode 166 as shown in FIG. 9 is utilized to provide a stable voltage reference for the supply potential $V_1$ which is required for the oscillator circuitry $92_1$ . . . $92_6$ as well as for the variable resistor 120 utilized in the biasing circuitry for the transistor 110, for example. The other source voltage $V_2$ may vary due to different types of DC supply means coupled to the input power connector 127 or because of a partially discharged battery 126. Accordingly, the supply potential $V_2$ is used only for functions that are relatively insensitive to voltage variations such as capacitor charging amplitude modulation and sound amplification, etc. The remainder of the power supply circuitry includes a current limiting resistor 168, two filter capacitors 170 and 172. As noted above and as shown in FIG. 1, the indicator light 36 which may be, for example, a light emitting diode, may be used as a visual indicator of power status. It can be applied to indicate a power on/off status or a low battery condition, depending upon the desires of the user. Also a miniature battery condition meter may be used in place of the indicator light as desired.

In conclusion then, respective oscillators and modulation amplifiers are associated with each flexible actuator and a group of leaf type switches actuated thereby are summed at the junction 152 by means of the six summing resistors $154_1$ . . . $154_6$ and coupled to the output jack 156. This output can then be amplified as desired by an amplifier within the body of the instrument with or without a built-in speaker or it can be amplified by an external musical instrument amplifier and speaker system. Typically the output jack 156 is intended to be connected to a standard electrically amplified guitar-type musical instrument amplifier or equivalent. If on the other hand the present invention is configured as a viol type instrument, the signal output would be coupled to a suitable musical instrument amplifier associated with such type of apparatus.

While the subject invention has been shown and described with a certain degree of particularity, it is not desired that the present disclosure be interpreted in a limiting sense, since it is desired that all modifications, alterations and variations coming within the spirit and scope of the present invention are meant to be included.

I claim:

1. In an electronic musical instrument for simulating a stringed instrument having a [body portion adapted to carry] tone generating means [and a neck portion adapted to carry a finger-board assembly coupled to said tone generator means] and being operable to vary the tonal output thereof, the improvement comprising:

tone generator means including an electrical oscillator circuit [for each fundamental frequency desired to be simulated and] including switch operated circuit means [operable from said fingerboard assembly] for selectively changing [the] tonal [output] frequency [of said oscillator circuit];

[a respective] *an* output amplifier circuit coupled to said oscillator circuit and being energized in accordance with the operative state of a player actuated switch device; and said player actuated switch device [consisting of] *comprising* a relatively thin [flexible blade-type] switch actuator member [mounted on edge in a substantially upright position on the outer surface of said body portion adjacent said fingerboard assembly,] *having a pair of sides and* being adapted [thereby] to be deflected bi-directionally [transverse] *transversely* [to said upright position] when strummed, struck, picked or plucked or bowed by a player, and at least one pair of electrical switch contacts located on each side of said actuator [element] *member*, wherein deflection of said actuator [element] *member* in either direction operates one of said pair of switch contacts to energize said output amplifier circuit.

2. The musical instrument as defined by claim 1 wherein said tone generator means comprises a plurality of electrical oscillator circuits and respective output amplifier circuits for a plurality of fundamental frequencies and wherein the respective [flexible blade-type] switch actuator members therefor are mounted side by side [such that their respective upper edges are] substantially parallel and oriented generally in line with the longitudinal axis of the instrument.

3. The musical instrument as defined by claim 2 wherein said *switch actuator members are* blade-type switch actuator elements [are] generally rectangular in shape with their lengthwise dimensions oriented substantially parallel to the longitudinal axis of the instrument.

4. The musical instrument as defined by claim 3 wherein the lengthwise dimension of said actuator members spans a region of [said body portion] *the instrument* wherein a stringed instrument is normally played.

5. The musical instrument as defined by claim 4 [wherein the] *including* outer edges [of] *on* said generally rectangular switch actuator members [are], *said outer edges being* substantially co-planar to simulate the multiple strings of a lute type instrument.

6. The musical instrument as defined by claim 4 [wherein the] *including* outer edges [of] *on* said generally rectangular switch actuator members [lie], *said outer edges lying* in selective different planes to simulate the strings of a viol type instrument.

7. The musical instrument as defined by claim 4 wherein said generally rectangular actuator members have substantially the same length and width dimensions.

8. The musical instrument as defined by claim [7] *4* wherein the length dimension is greater than the width dimension.

9. The musical instrument as defined by claim 1 wherein said output amplifier is energized by the application of a supply potential to generate an audio output signal and wherein said at least one pair of switch contacts is connected intermediate said supply potential and said output amplifier circuit.

10. The musical instrument as defined by claim 9 wherein said output amplifier circuit additionally includes [a compensated balanced bridge] *an* attenuator network coupled intermediate said switch contacts and said amplifier circuit for coupling said supply potential thereto.

11. The musical instrument as defined by claim 10 wherein said output amplifier circuit comprises a transistor amplifier circuit having a base input circuit and additionally including variable base bias voltage means coupled to said base input circuit for providing harmonic control of said audio output signal.

12. The amplifier circuit as defined by claim 11 wherein said [compensated] attenuator network comprises at least two resistive impedances and at least two capacitors coupled together in a bridge circuit arrangement to the collector circuit of said transistor amplifier, and wherein said switch device includes plural electrical switch contacts located on each side of said switch actuator element and being operable consecutively by deflection of said actuator element to apply said supply potential to selective circuit points of said [compensated] attenuator network.

13. The musical instrument as defined by claim 11 wherein said transistor amplifier comprises a class C type transistor amplifier.

14. The musical instrument as defined by claim 9 wherein said electrical oscillator circuit comprises a programmable unijunction transistor oscillator having an RC time control circuit which is adapted to be controlled by means of a set of fret-board switches [located on said fingerboard assembly].

*15. The musical instrument as defined in claim 1 wherein said instrument includes a body portion and a neck portion adapted to carry a fingerboard assembly connected to said body portion, said fingerboard assembly being coupled to said tone generator.*

*16. The musical instrument as defined in claim 3 wherein said switch actuator member is mounted in a vertical direction.*

*17. The musical instrument of claim 2 wherein said switch actuator members are flexible.*

*18. An electronic musical instrument for simulating a stringed instrument comprising:*

*(a) tone generating means,*

*(b) an output amplifying means connected to said tone generating means,*

*(c) player actuated switch means operatively connected to said amplifying means,*

*(d) an attenuator network coupled intermediate said switch means and said amplifying means,*

*(e) means including said amplifying means, said network and said switch means for:*

*(1) producing an attack portion of an audio frequency envelope upon initial actuation of said switch means from a normal state,*

*(2) sustaining a sound produced by said tone generating means for as long as said switch is actuated, and*

*(3) dampening the sound gradually as said switch is allowed to return to a normal state;*

*(f) said amplifying means comprising a transistorized amplifier circuit, said network comprising at least two resistive impedances and at least two capacitors cou-*

*pled together in a bridge circuit arrangement to a collector circuit of said transistor amplifier.*

*19. An instrument as defined in claim 18 wherein said switch means includes an actuator, a plurality of electrical contacts being operable consecutively by movement of said actuator to apply a supply potential to selective circuit points of said network.*

*20. The musical instrument of claim 10, 12 or 18 wherein said attenuator comprises a compensated balanced bridge attenuator.*

* * * * *